US007971890B2

(12) United States Patent
Richardson

(10) Patent No.: US 7,971,890 B2
(45) Date of Patent: Jul. 5, 2011

(54) INDEPENDENT SUSPENSION ASSEMBLY

(75) Inventor: Gregory A. Richardson, Nixa, MO (US)

(73) Assignee: Reyco Granning, LLC, Mount Vernon, MO (US)

( * ) Notice: Subject to any disclaimer, the term of this patent is extended or adjusted under 35 U.S.C. 154(b) by 74 days.

(21) Appl. No.: 12/169,449

(22) Filed: Jul. 8, 2008

(65) Prior Publication Data

US 2009/0020973 A1 Jan. 22, 2009

Related U.S. Application Data

(60) Provisional application No. 60/959,633, filed on Jul. 16, 2007.

(51) Int. Cl.
*B60G 3/18* (2006.01)
*B60G 11/46* (2006.01)

(52) U.S. Cl. ... 280/124.163; 280/124.135; 280/124.157; 280/124.17

(58) Field of Classification Search .......... 280/124.134, 280/124.135, 124.136, 124.163, 124.17, 280/124.175, 124.157; 267/31, 52, 229, 267/241

See application file for complete search history.

(56) References Cited

U.S. PATENT DOCUMENTS

| | | | | |
|---|---|---|---|---|
| 2,045,028 A | * | 6/1936 | Sellman | 267/257 |
| 2,100,136 A | * | 11/1937 | Fowler | 267/231 |
| 2,117,577 A | * | 5/1938 | Simning | 280/680 |
| 2,942,893 A | * | 6/1960 | Nallinger | 280/124.111 |
| 3,948,337 A | | 4/1976 | Richardson et al. | |
| 4,589,678 A | * | 5/1986 | Lund | 280/5.511 |
| 4,919,399 A | | 4/1990 | Selzer et al. | |
| 5,271,638 A | | 12/1993 | Yale | |
| 5,306,034 A | * | 4/1994 | Buchanan | 280/124.135 |
| 5,401,049 A | | 3/1995 | Richardson | |
| 5,560,641 A | | 10/1996 | Vogler | |
| 6,176,501 B1 | | 1/2001 | Bartolone | |
| 6,378,881 B2 | * | 4/2002 | Stenvall | 280/124.171 |
| 6,394,474 B1 | | 5/2002 | Warinner et al. | |

(Continued)

FOREIGN PATENT DOCUMENTS

| | | | |
|---|---|---|---|
| DE | 3637663 A1 | * | 5/1987 |
| DE | 4313028 A1 | * | 11/1993 |
| JP | 7-52625 | * | 2/1995 |
| JP | 10-226210 | * | 8/1998 |
| WO | WO 2004094170 A1 | * | 11/2004 |

OTHER PUBLICATIONS

Machine Translation of DE 4313028 A1.* Machine Translation of JP 10-226210.*
Machine Translation of JP 7-52625.*
Machine Translation of DE 3637663 A1.*

*Primary Examiner* — Ruth Ilan
*Assistant Examiner* — Joseph Rocca
(74) *Attorney, Agent, or Firm* — George Pappas

(57) ABSTRACT

An independent suspension assembly having a wheel support member and upper and lower control arms that is well adapted for use with the front steerable wheels of a large truck. The upper and lower control arms are each pivotally secured to the wheel support member at a first location on the control arm and pivotally supported relative to the frame at a second location on the control arm. The wheel support member is vertically displaceable relative to the frame by pivotal movement of the upper and lower control arms relative to both the frame and wheel support member. A leaf spring and an air spring may be positioned between the lower control arm and frame to communicate loads therebetween. A vertically extending linkage member may be disposed between the lower control arm and frame. The lower control arm may extend across the longitudinal centerline of the vehicle below the engine.

18 Claims, 7 Drawing Sheets

U.S. PATENT DOCUMENTS

| | | | |
|---|---|---|---|
| 6,457,729 B2 * | 10/2002 | Stenvall | 280/124.134 |
| 6,485,040 B1 | 11/2002 | Dudding | |
| 6,966,568 B2 | 11/2005 | Wen et al. | |
| 7,195,260 B2 | 3/2007 | Richardson | |
| 7,246,808 B2 * | 7/2007 | Preijert | 280/124.17 |
| 2004/0155426 A1 * | 8/2004 | Wen et al. | 280/124.162 |
| 2005/0161896 A1 * | 7/2005 | Reineck | 280/124.128 |
| 2006/0090445 A1 * | 5/2006 | McLean et al. | 56/228 |
| 2006/0113744 A1 * | 6/2006 | Preijert | 280/124.163 |
| 2007/0013160 A1 | 1/2007 | Richardson | |

* cited by examiner

INDEPENDENT SUSPENSION ASSEMBLY

CROSS REFERENCE TO RELATED APPLICATIONS

This application claims priority under 35 U.S.C. 119(e) of U.S. provisional patent application Ser. No. 60/959,633 filed on Jul. 16, 2007 entitled INDEPENDENT FRONT SUSPENSION the disclosure of which is hereby incorporated herein by reference.

BACKGROUND OF THE INVENTION

1. Field of the Invention

The present invention relates to independent suspension assemblies and, more particularly, to independent suspension assemblies that can be used with the steerable wheels of a vehicle.

2. Description of the Related Art

Steering suspensions for heavy duty trucks such as, for example, semi-tractor trucks, class 5 through 8 trucks, etc., are typically manufactured using a solid axle extending under the truck engine in a generally perpendicular or transverse to the longitudinal centerline of the truck. At each end of the rigid axle, spindles are typically pivotally attached with kingpins for thereby pivotally mounting the truck front steering wheels. The vehicle chassis of such rigid front axle suspensions is often supported over the axle using leaf springs and/or air springs. The suspension characteristics of suspension systems having a rigid axle extending across and between the front wheels of the vehicle are generally undesirable because a bump experienced by one of the front wheels causes the entire front axle and, thus, the vehicle to move in response to the bump.

Independent front suspension systems are known. The incorporation of independent front suspension systems in a large truck, however, is difficult. A primary source of this difficulty is that the engines of such large trucks often extend between and below the truck chassis frame members into the same space where independent front suspension components are typically located.

An improved independent suspension system that can be used with the front steerable wheels of a large truck is desirable.

SUMMARY OF THE INVENTION

The present invention provides an improved independent suspension system that can be used with the front steerable wheels of a large truck.

The invention comprises, in one form thereof, an independent suspension assembly for a vehicle having a frame and a plurality of wheels. The independent suspension assembly includes a wheel support member, an upper control arm and a lower control arm. One of the vehicle wheels is mountable on the wheel support member. The upper control arm is pivotally secured to the wheel support member at a first location on the upper control arm and pivotally supported relative to the frame at a second location on the upper control arm. The lower control arm is pivotally secured to the wheel support member at a first location on the lower control arm and pivotally supported relative to the frame at a second location on the lower control arm. The wheel support member is vertically displaceable relative to the frame by pivotal movement of the upper and lower control arms relative to the frame and to the wheel support member. The independent suspension assembly also includes a leaf spring assembly and an air spring assembly. The leaf spring assembly is operably disposed between the lower control arm and the frame wherein a load communicated between the wheel support member and the frame is at least partially transferrable through the leaf spring assembly. The air spring assembly is operably disposed between the lower control arm and the frame wherein a load communicated between the wheel support member and the frame is at least partially transferrable through the air spring assembly.

The invention comprises, in another form thereof, an independent suspension assembly for a vehicle having a frame and a plurality of wheels. The independent suspension assembly includes a wheel support member, an upper control arm, a lower control arm and a linkage member. One of the vehicle wheels is mountable on the wheel support member. The upper control arm is pivotally secured to the wheel support member at a first location on the upper control arm and pivotally supported relative to the frame at a second location on the upper control arm. The lower control arm is pivotally secured to the wheel support member at a first location on the lower control arm and pivotally supported relative to the frame at a second location on the lower control arm. The wheel support member is vertically displaceable relative to the frame by pivotal movement of the upper and lower control arms relative to the frame and to the wheel support member. The linkage member is disposed between the lower control arm and the frame. The lower control arm is pivotally secured to the linkage member. The pivotal connection between the lower control arm and the linkage member defines the second lower control arm location and a first location on the linkage member. The linkage member is pivotally supported relative the frame at a second location on the linkage member.

In some embodiments of this form of the invention, the second linkage member location is disposed vertically above the first linkage member location. The linkage member may also take the form of a substantially V-shaped linkage member.

The invention comprises, in still another form thereof, an independent suspension system for a vehicle having a frame and a plurality of wheels wherein the vehicle defines a longitudinal centerline. The plurality of wheels includes paired first and second wheels located on opposite sides of the longitudinal centerline with the first and second wheels being steerable wheels. The independent suspension system includes a first independent suspension assembly for supporting the first wheel and a second independent suspension assembly for supporting the second wheel. Each of the first and second independent suspension assemblies includes a wheel support member, an upper control arm and a lower control arm. One of the first and second wheels is mountable on each of the wheel support members. The wheel support members being controllably rotatable about a substantially vertical axis. The upper control arms are pivotally secured to a wheel support member at a first location on the upper control arm and pivotally supported relative to the frame at a second location on the upper control arm. The lower control arms are pivotally secured to a wheel support member at a first location on the lower control arm and pivotally supported relative to the frame at a second location on the lower control arm. The lower control arms are elongate arms that extend across the longitudinal centerline of the vehicle such that the first and second locations on each of the lower control arms are disposed on opposite sides of the longitudinal centerline. The wheel support members are vertically displaceable relative to the frame by pivotal movement of the upper and lower control arms relative to the frame and to the wheel support members.

In some embodiments of this form of the invention, the lower control arms extend below the engine of the vehicle such that at least a portion of each of the lower control arms are disposed below the engine.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Figure 1:
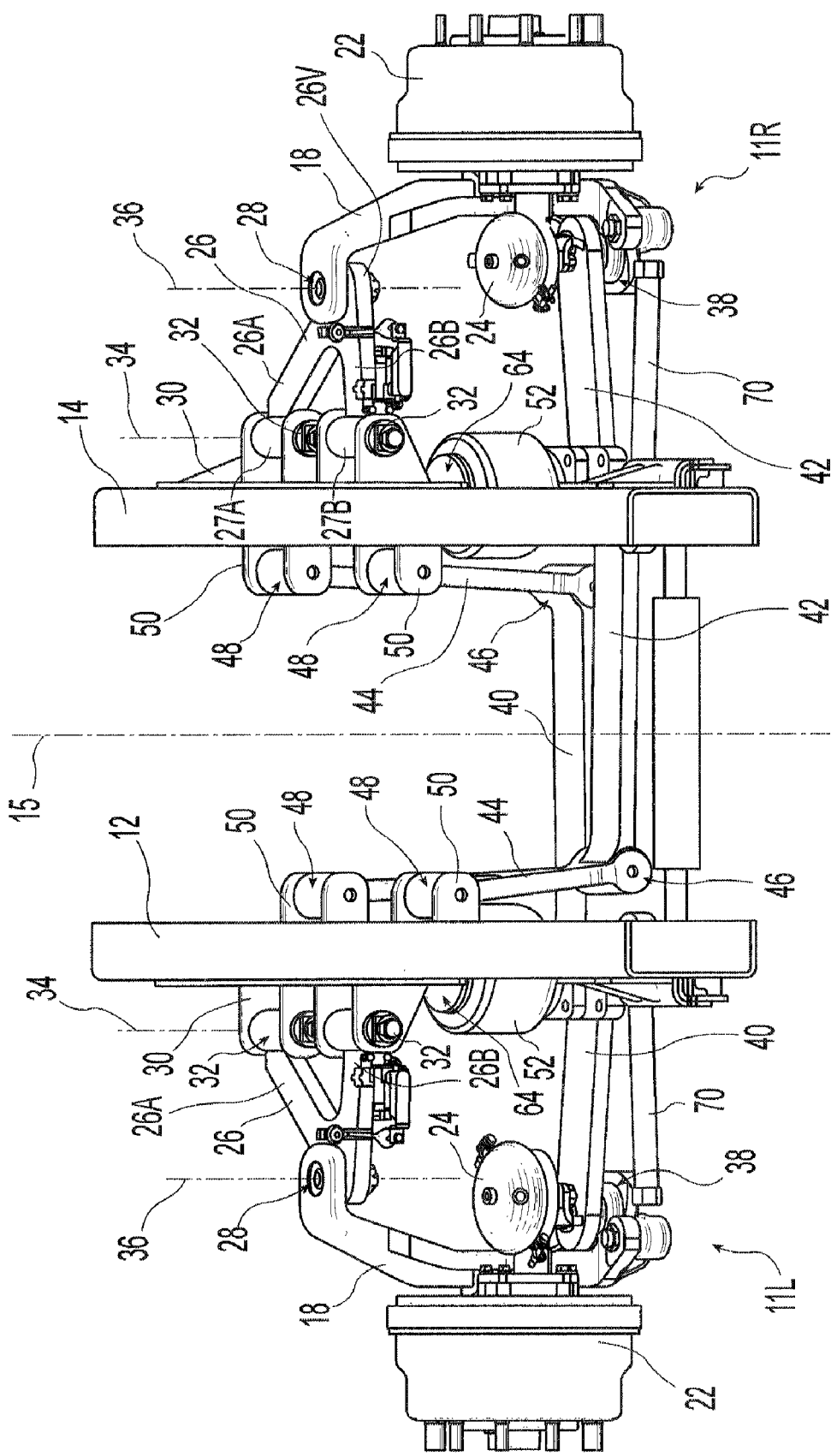
FIG. 1 is a front perspective view of an independent suspension assembly in accordance with the principles of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

An independent front suspension system constructed in accordance with the principles of the present invention is shown in the drawings and is generally indicated by the numeral 10. Independent suspension system 10 includes two separate independent suspension assemblies 11L, 11R for mounting a paired set of wheels of the vehicle. The two wheels mounted on the illustrated suspension assemblies 11L, 11R are the front steerable wheels of the vehicle and are located on opposite sides of the longitudinal centerline 15 of the vehicle. The illustrated independent suspension system 10 is adapted to be mounted on a truck or other vehicle chassis which includes a pair of longitudinally extending frame members 12 and 14 but may also be used with vehicles having alternative chassis configurations. Similarly, while the illustrated embodiment employs independent suspension assemblies 11L, 11R with the front, steerable wheels of the vehicle, similar independent suspension assemblies could also be employed with rear steerable or non-steerable wheels of the vehicle.

The illustrated frame members 12, 14 are steel channel beams as are commonly used in a truck chassis. As diagrammatically depicted in FIGS. 6 and 7, the vehicle engine 16 is carried by the chassis in a known and customary manner, and is typically located between the chassis frame members 12, 14 and at least partially extends therebelow. The mounting of independent suspension system 10 to the frame members 12, 14 is more fully described hereinbelow.

Independent suspension system 10 includes a pair of wheel support members 18 which take the form of steering knuckles in the illustrated embodiments. Steering knuckles 18 have a spindle 20 adapted to rotatably support a front wheel (not shown), brake drum 22, brake actuator 24 etc, in a known and customary manner.

At their upper ends, the steering knuckles 18 are pivotally attached to an upper control arm 26 with a ball joint 28. The illustrated upper control arms 26 are V-shaped and are pivotally attached, opposite steering knuckle 18, to a bracket 30 which is in turn rigidly secured to a respective chassis frame member 12, 14. The illustrated upper control arms 26 include arms 26A and 26B which intersect at vertex 26V. The distal ends 27A, 27B of arms 26A, 26B are pivotally secured to bracket 20 with bushings 32 for pivotal motion about a longitudinal axis 34 extending parallel with longitudinal centerline 15. Vertex 26V of upper control arm 26 is pivotally secured to steering knuckle 18 with ball joint 28. Ball joint 28 allows the steering knuckle 18 to rotate about the vertical axis 36 and also allows for pivotal movement about an axis generally parallel to longitudinal centerline 15. Wheels mounted on steering knuckle 18 are steered by the selective rotation of steering knuckle 18 about vertical axis 36 by steering arms 70. Relative pivotal movement between upper control arm 26 and steering knuckle 18 about a longitudinal axis at ball joint 28 allows steering knuckle 18 to move vertically up and down as more fully discussed hereinbelow. It is noted that brackets 30 are attached to respective chassis members 12, 14 with bolts, welding and/or other suitable means.

Figure 2:
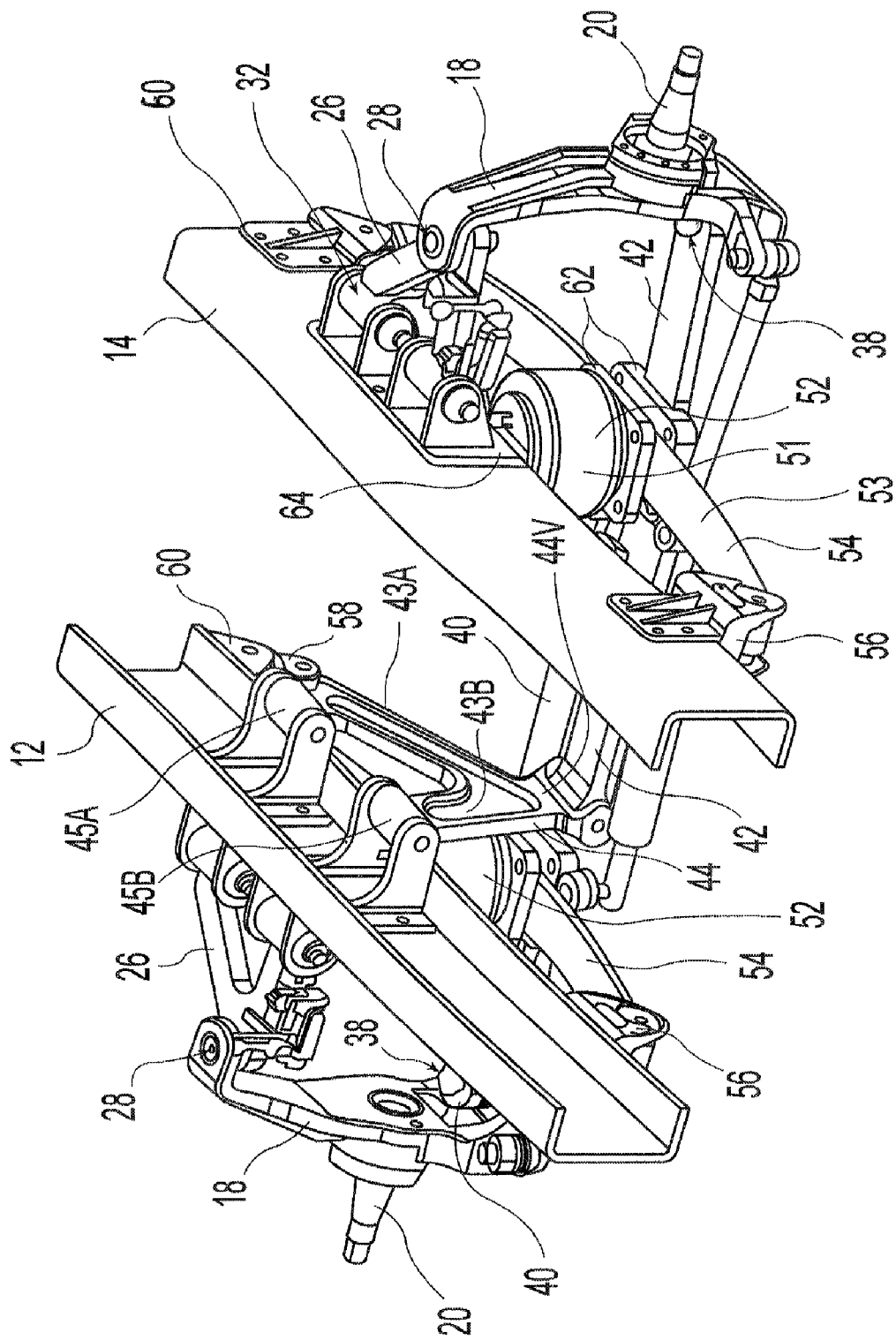
FIG. 2 is another perspective view of the independent suspension assembly of FIG. 1 with the wheel brake drums and brake components removed.
Figure 3:
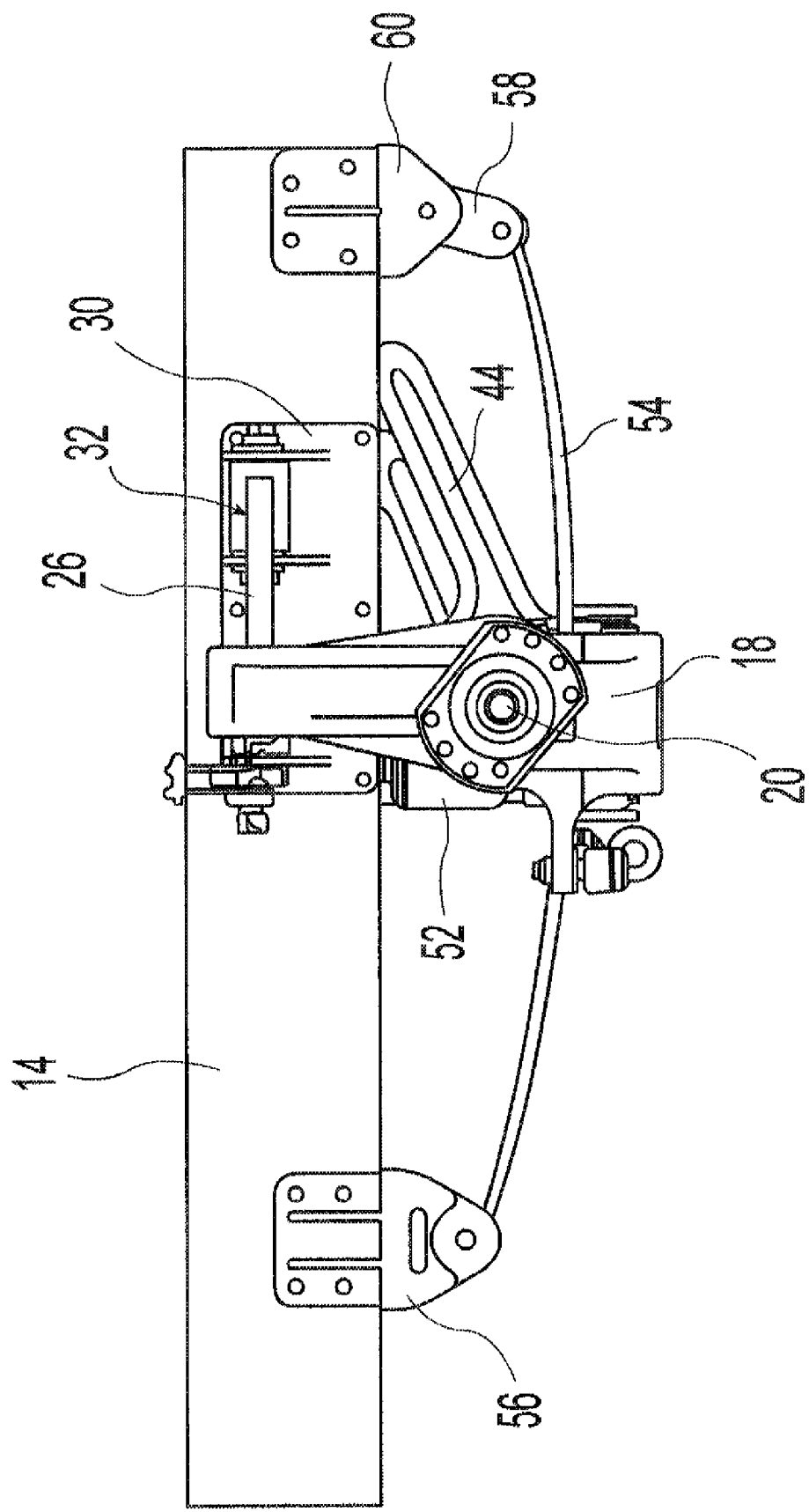
FIG. 3 is a side elevation view of the independent suspension assembly shown in FIG. 2.
Figure 4:
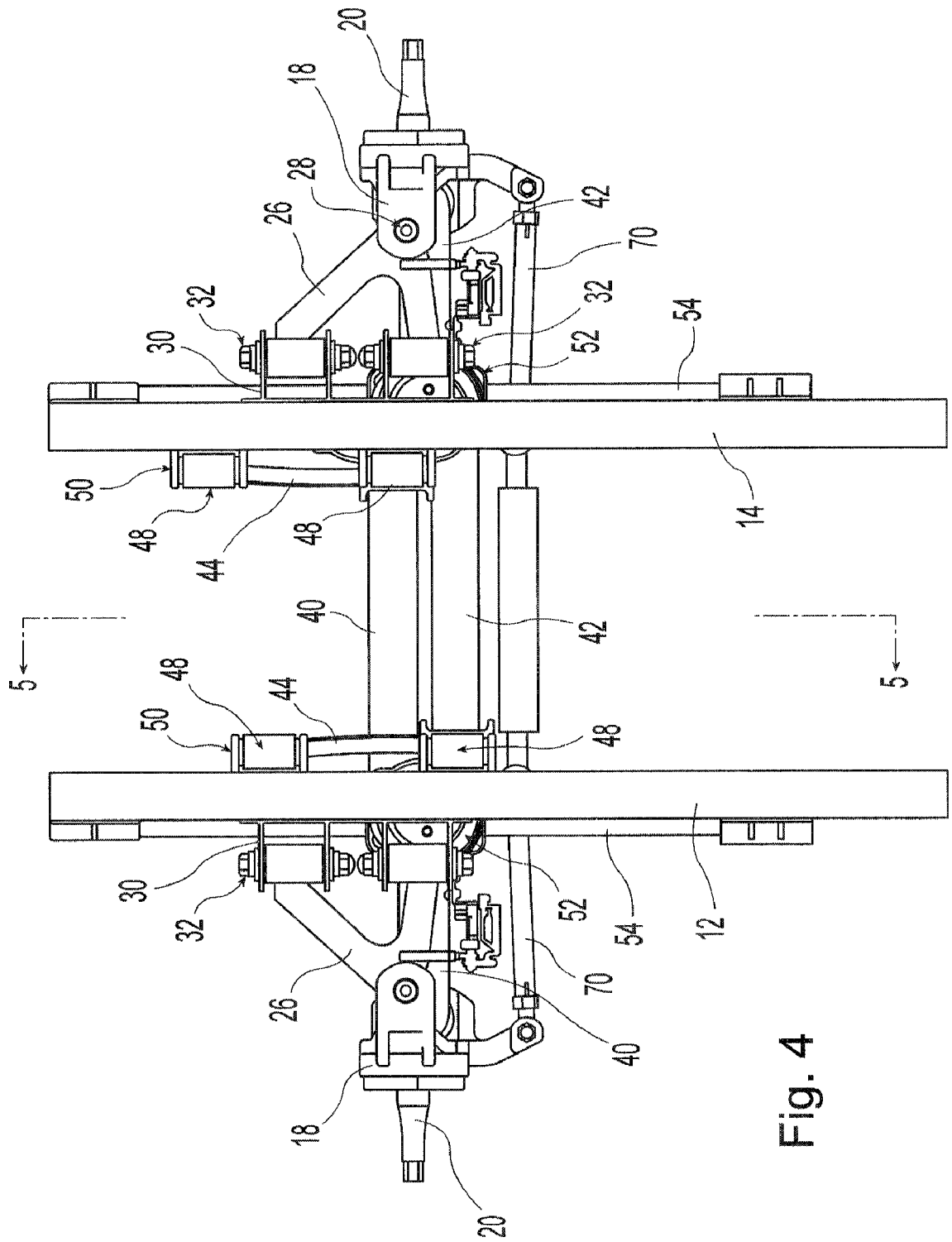
FIG. 4 is a top plan view of the independent suspension assembly shown in FIG. 2.
Figure 5:
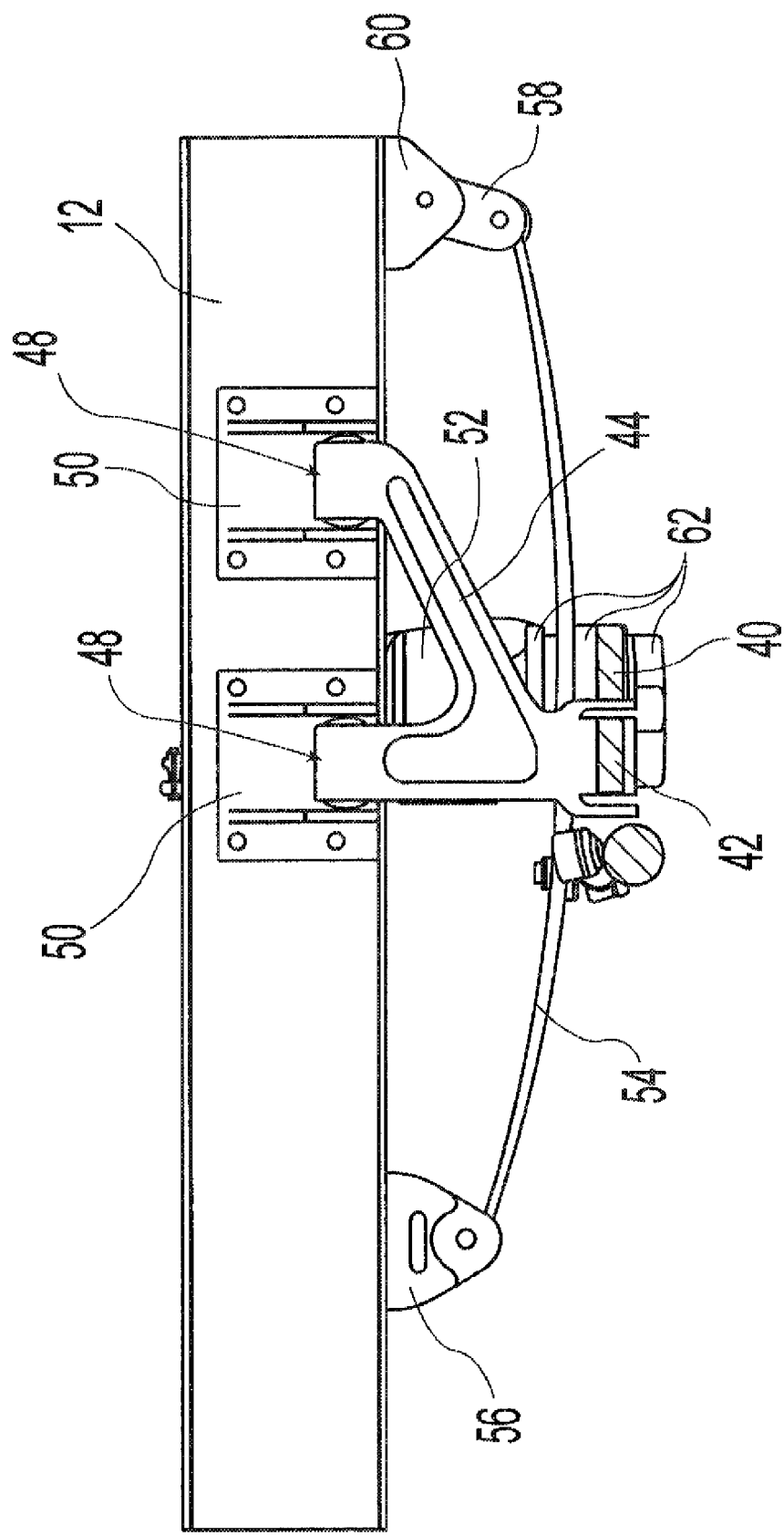
FIG. 5 is a cross sectional view of the independent suspension assembly shown in FIG. 4 taken along line 5-5.

As best seen in FIGS. 1, 2 and 4, the steering knuckles 18 are pivotally attached at their lower ends, with ball joints 38, to a respective lower control arm 40, 42. Referring more particularly to FIG. 1, the steering knuckle 18 shown on the left of FIG. 1 is pivotally attached via the ball joint 38 to lower control arm 40 which extends from the ball joint 38 to the V-shaped linkage member or swing arm 44. Thus, lower control arm 40 is at one terminal end pivotally attached via the ball joint 38 to the steering knuckle 18, and at its other terminal end, is pivotally attached via a bushing 46 to the V-shaped linkage member 44. Linkage member 44 extends vertically upwardly and is pivotally attached, at its other end, via bushings 48 and brackets 50 to the chassis frame member 14.

In a similar fashion, the steering knuckle 18 shown on the right hand side of FIG. 1 is pivotally attached at its lower end via a ball joint 38 to the lower control arm 42. At its other terminal end, the lower control arm 42 is pivotally attached to a V-shaped linkage member 44 with a bushing 46 and is pivotally supported by the other chassis frame member 12. More specifically, this generally V-shaped linkage member 44 extends upwardly and, as seen in FIG. 2, has two arms 43A, 43B which intersect at vertex 44V and, at their opposite ends, define distal ends 45A, 45B. Distal ends 45A, 45B are positioned vertically above vertex 44V and are pivotally attached via bushings 48 and brackets 50 to chassis frame member 12.

Accordingly, as best seen in FIGS. 1 and 2, the lower control arms 40, 42 are located adjacent one another, side by side, vertically below the chassis members 12, 14. Lower control arms 40, 42 extend generally transverse to longitudinal centerline 15 with control arm 42 being positioned more forward along centerline 15 and control arm 40 being positioned more rearward. The steering knuckle 18 shown the left hand side of the drawing, at its lower end, is pivotally secured via lower control arm 40 and a V-shaped linkage member 44 to the opposite side chassis member 14. Similarly, the steering knuckle 18 shown on the right hand side of the drawing, at its lower end, is pivotally secured via lower control arm 42 and a V-shaped linkage member 44 to the opposite side chassis frame member 12. In other words, both of the lower control arms 40, 42 extend across longitudinal centerline 15 such that each of the lower control arms 40, 42 are pivotally secured to a steering knuckle 18 with a ball joint 38 at a first location and pivotally secured to a linkage member 44 at a second location wherein those two locations are on opposite sides of longitudinal centerline 15. Engine 16 is also located between the front steerable wheels in the illustrated embodiment and at least a portion of each of the lower control arms 40, 42 is disposed below engine 16.

Similar to ball joints 28 securing steering knuckles 18 to upper control arms 26, ball joints 38 securing lower control arms 40, 42 to steering knuckles 18 permit rotation about vertical axis 36 (to thereby allow for steering movement of steering knuckle 18) and pivotal movement about an axis extending generally parallel to longitudinal axis 15 (to thereby allow for the vertical displacement of steering knuckle 18).

Thus, for each suspension assembly 11L, 11R, both the upper control arm 26 and lower control arm 40, 42 is pivotally secured to steering knuckle 18 with ball joint 28 at one end and has an opposite end that is pivotally supported relative to the vehicle frame. In the illustrated embodiment, lower control arms 40, 42 are pivotally supported on the frame through intermediate linkage members 44 which are moveable relative to the frame while upper control arms 26 are directly pivotally supported on the frame in a fixed position via brackets 30 and bushings 32.

As can now be appreciated, each of the steering knuckles 18 are secured to the chassis with a generally parallelogram structure comprising an upper control arm 26 and a respective lower control arm 40, 42. In the illustrated embodiments, the lower control arms 40, 42 are capable of slight transverse motion which is provided by the linkage members 44. As noted above, ball joints 38 connecting the lower ends of the steering knuckles 18 to the lower control arms 40, 42 are similar to the ball joints 28 for allowing pivotal motion of the steering knuckle 18 about the vertical axis 36 while also allowing pivotal motion about a longitudinal axis to thereby permit the steering knuckle to move vertically up and down. Thus, steering knuckles 18 are vertically displaceable relative to the vehicle frame by the pivotal movement of upper and lower control arms 26, 40, 42 relative to both the vehicle frame (e.g., chassis members 12, 14) and the steering knuckle 18 attached thereto.

Figure 6:
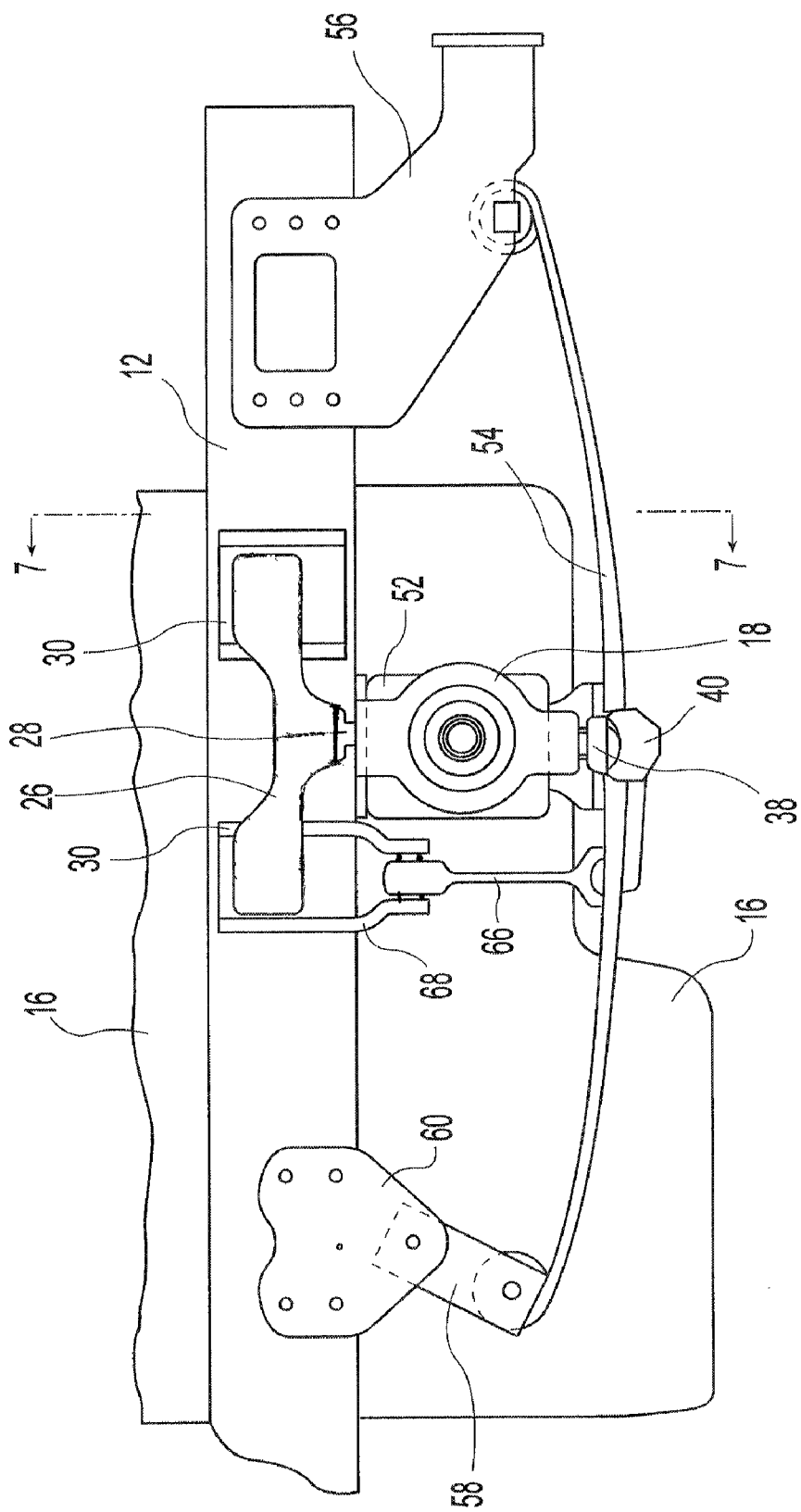
FIG. 6 is a side elevation view of a modified embodiment of the independent suspension assembly constructed in accordance with the principles of the present invention.
Figure 7:
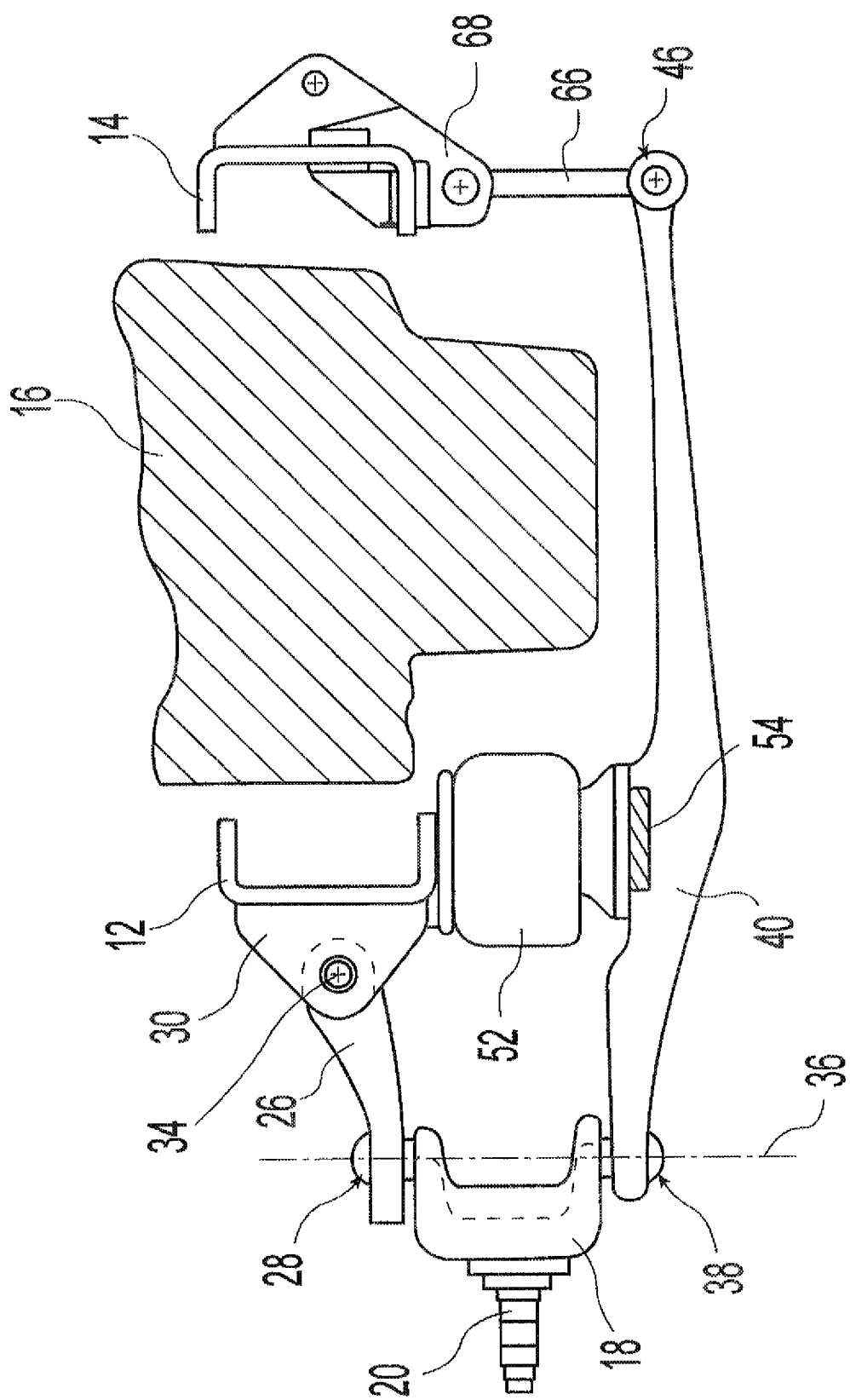
FIG. 7 is a cross sectional view of the independent suspension assembly shown in FIG. 6 taken along line 7-7.

The lower control arms 40, 42 are secured to and are adapted to transfer loads therefrom to the respective frame members 12, 14 thereabove with an air spring assembly 51 and a leaf spring assembly 53. More particularly, as best shown in FIGS. 2 and 6, each leaf spring assembly 53 includes a leaf spring 54 pivotally attached at its forward terminal end to a bracket 56 which is, in turn, secured to a vehicle chassis frame member 12, 14. At its rear terminal end, each leaf spring 54 is pivotally secured to a shackle 58 which is itself pivotally secured to a bracket 60. Bracket 60 is rigidly secured to a respective chassis frame member 12, 14. At about the center area thereof, each leaf spring 54 is rigidly secured to a respective lower control arm 40, 42. In FIG. 7, the leaf spring 54 is shown rigidly secured to the lower control arm 40. The air spring assemblies 51 include an air spring 52 and are located between the interconnection of the leaf spring 54 and a lower control arm 40, 42 and a chassis frame member. In FIG. 7, the air spring 52 is shown located above the interconnection between the leaf spring 54 and lower control arm 40 and below the chassis frame member 12.

Preferably, as best seen in FIG. 2, steel plates 62 may be used for sandwiching one or more of the leaf springs 54 and a respective control arm 40, 42. Steel plates 62 bolted together with U-bolts or other bolts or fasteners (not shown) to rigidly secure the leaf springs 54 to a respective lower control arm 40, 42 and to provide a securement location for the air spring 52 above the leaf spring 54. The upper end of air springs 52 are secured to a respective chassis frame member 12, 14 with an air spring bracket 64 or other suitable means.

It is noted that in the embodiment of FIGS. 6 and 7, the V-shaped linkage members or swing bars 44 have been replaced with straight linkage members 66 which, at their upper ends, are pivotally secured to the underside of a chassis frame member 12, 14 with a bracket 68 at a position located vertically above the pivotal connection between linkage members 66 and a respective one of the lower control arms 40, 42.

As should now be appreciated, an independent suspension system 10 is provided wherein the steering knuckles are each pivotally secured by upper control arms 26 and respective lower control arms 40, 42. The steering knuckles 18 move vertically up and down in rough road conditions with the leaf springs 54 and air springs 52 transferring loads directly to the chassis frame members. Thus, by operably disposing a leaf spring assembly 53 and an air spring assembly 51 between each of the lower control arms 40, 42 and respective chassis members 12, 14, a load communicated between the steering knuckle 18 and vehicle frame are transferrable through a respective lower control arm 40, 42, leaf spring assembly 53 and air spring assembly 51 to a respective chassis member 12, 14.

The leaf springs 54 also provide lateral support to the lower control arms and limit side-to-side movement (i.e., movement transverse to longitudinal centerline 15) of the lower control arms. The suspension system 10 maximizes the area for the vehicle engine 16 between and below the chassis frame members 12 and 14 by extending only the terminal ends of the lower control arms 40, 42 thereunder to the opposite chassis frame members 12, 14 with the upper control arms 26 being attached to the near side chassis frame members 12, 14. In other words, while the opposite, pivotally attached ends of each lower control arm 40, 42 are located on opposite sides of longitudinal centerline 15, upper control arms 26 are located entirely on one side of longitudinal centerline 15. The independent suspension system 10 is yet further advantageous in that, unlike typical independent front suspension systems wherein the ground clearance at the engine changes and decreases over rough terrain, the present independent suspension system tends to maintain the ground clearance as the vehicle traverses over rough terrain.

It is noted that the steering knuckles 18 are selectively pivoted for steering the vehicle in a known and customary manner with a rack and pinion or other steering components. As shown in the drawings, steering arms 70 are pivotally secured to the knuckles 18 for moving and steering the vehicle in a known and customary manner.

While this invention has been described as having an exemplary design, the present invention may be further modified within the spirit and scope of this disclosure. This application is therefore intended to cover any variations, uses, or adaptations of the invention using its general principles.

What is claimed is:

1. An independent suspension assembly for a vehicle having a frame and a plurality of wheels, said independent suspension assembly comprising:

a wheel support member, one of the vehicle wheels being mountable on said wheel support member;

an upper control arm, said upper control arm being pivotally secured to said wheel support member at a first location on said upper control arm and pivotally supported relative to the frame at a second location on said upper control arm;

a lower control arm, said lower control arm being pivotally secured to said wheel support member at a first location on said lower control arm and pivotally supported relative to the frame at a second location on said lower control arm;

a linkage member disposed between said lower control arm and the frame, said lower control arm being pivotally secured to said linkage member at a first location on said linkage member and said linkage member being pivotally supported relative to the frame at a second location on said linkage member;

wherein said wheel support member is vertically displaceable relative to the frame by pivotal movement of said upper and lower control arms relative to the frame and to said wheel support member, a leaf spring assembly having first and second ends and a central area disposed therebetween, each of said first and second ends of said leaf spring assembly being operably coupled with the frame and said central area being operably coupled with said lower control arm, said leaf spring assembly thereby being operably disposed between said lower control arm and the frame wherein a load communicated between said wheel support member and the frame is at least partially transferrable through said leaf spring assembly; and an air spring assembly operably disposed between said lower control arm and the frame wherein a load communicated between said wheel support member and the frame is at least partially transferrable through said air spring assembly.

2. The independent suspension assembly of claim 1 wherein said linkage member is pivotally secured to the frame at said second linkage member location and wherein said second linkage member location is spaced vertically above said first linkage member location.

3. The independent suspension assembly of claim 2 wherein said linkage member is a substantially V-shaped linkage member having a vertex and first and second arms, said first and second arms defining first and second distal ends opposite said vertex wherein said linkage member is pivotally secured to said lower control arm at said vertex and said linkage member is pivotally secured to the frame at said first and second distal ends.

4. The independent suspension assembly of claim 1 wherein the vehicle defines a longitudinal centerline and said first and second locations on said lower control arm are disposed on opposite sides of the longitudinal centerline.

5. The independent suspension assembly of claim 1 wherein said wheel support member is controllably rotatable about a substantially vertical axis whereby a wheel mounted on said wheel support member is a steerable wheel.

6. The independent suspension assembly of claim 1 wherein said upper control arm is a substantially V-shaped control arm having a vertex and first and second arms, said first and second arms defining first and second distal ends opposite said vertex wherein said upper control arm is pivotally secured to said wheel support member at said vertex and said upper control arm is pivotally secured to the frame at said first and second distal ends.

7. An independent suspension assembly for a vehicle having a frame and a plurality of wheels, said independent suspension assembly comprising:

a wheel support member, one of the vehicle wheels being mountable on said wheel support member;

an upper control arm, said upper control arm being pivotally secured to said wheel support member at a first location on said upper control arm and pivotally supported relative to the frame at a second location on said upper control arm;

a lower control arm, said lower control arm being pivotally secured to said wheel support member at a first location on said lower control arm and pivotally supported relative to the frame at a second location on said lower control arm;

wherein said wheel support member is vertically displaceable relative to the frame by pivotal movement of said upper and lower control arms relative to the frame and to said wheel support member; and a linkage member disposed between said lower control arm and the frame, said lower control arm being pivotally secured to said linkage member wherein said pivotal connection between said lower control arm and said linkage member defines said second lower control arm location and a first location on said linkage member; and wherein said linkage member is pivotally supported relative the frame at a second location on said linkage member.

8. The independent suspension assembly of claim 7 wherein said second linkage member location is spaced vertically above said first linkage member location.

9. The independent suspension assembly of claim 7 wherein said linkage member is a substantially V-shaped linkage member having a vertex and first and second arms, said first and second arms defining first and second distal ends opposite said vertex wherein said linkage member is pivotally secured to said lower control arm at said vertex and said linkage member is pivotally secured to the frame at said first and second distal ends.

10. The independent suspension assembly of claim 7 further comprising:

a leaf spring assembly operably disposed between said lower control arm and the frame wherein a load communicated between said wheel support member and the frame is at least partially transferrable through said leaf spring assembly; and an air spring assembly operably disposed between said lower control arm and the frame wherein a load communicated between said wheel support member and the frame is at least partially transferrable through said air spring assembly.

11. The independent suspension assembly of claim 7 wherein the vehicle defines a longitudinal centerline and said first and second locations on said lower control arm are disposed on opposite sides of the longitudinal centerline.

12. The independent suspension assembly of claim 7 wherein said wheel support member is controllably rotatable about a substantially vertical axis whereby a wheel mounted on said wheel support member is a steerable wheel.

13. An independent suspension system for a vehicle having a frame and a plurality of wheels wherein the vehicle defines a longitudinal centerline and the plurality of wheels includes paired first and second wheels located on opposite sides of the longitudinal centerline, the first and second wheels being steerable wheels; said independent suspension system comprising:

a first independent suspension assembly for supporting the first wheel and a second independent suspension assembly for supporting the second wheel wherein each of said first and second independent suspension assemblies includes:

a wheel support member, one of the first and second wheels being mountable on said wheel support member, said wheel support member being controllably rotatable about a substantially vertical axis;

an upper control arm, said upper control arm being pivotally secured to said wheel support member at a first location on said upper control arm and pivotally supported relative to the frame at a second location on said upper control arm;

a lower control arm, said lower control arm being pivotally secured to said wheel support member at a first location on said lower control arm and pivotally supported relative to the frame at a second location on said lower control arm;

wherein said wheel support member is vertically displaceable relative to the frame by pivotal movement of said upper and lower control arms relative to the frame and to said wheel support member;

wherein said first and second locations on said lower control arm are disposed on opposite sides of the longitudinal centerline;

a linkage member disposed between said lower control arm and the frame, said lower control arm being pivotally secured to said linkage member at a first location on said linkage member and said linkage member being pivotally supported relative to the frame at a second location on said linkage member; and a leaf spring assembly having first and second ends and a central area disposed therebetween, each of said first and second ends of said leaf spring assembly being operably coupled with the frame and said central area being operably coupled with said lower control arm, said leaf spring assembly thereby being operably disposed between said lower control arm and the frame wherein a load communicated between said wheel support member and the frame is at least partially transferrable through said leaf spring assembly.

14. The independent suspension system of claim 13 wherein the vehicle includes an engine and wherein at least a portion of each of said lower control arms is disposed below the engine.

15. The independent suspension system of claim 13 wherein each of said first and second suspension assemblies further comprises:
    an air spring assembly operably disposed between said lower control arm and the frame wherein a load communicated between said wheel support member and the frame is at least partially transferrable through said air spring assembly.

16. The independent suspension system of claim 13 wherein each of said upper control arms is disposed entirely on one side of the longitudinal centerline.

17. The independent suspension system of claim 13 wherein:
    wherein each of said linkage members is respectively pivotally secured to the frame at said second linkage member locations and wherein each of said linkage members is oriented to respectively position said second linkage member locations vertically above said first linkage member locations;
    wherein the vehicle includes an engine and at least a portion of each of said lower control arms is disposed below the engine; and
    each of said upper control arms is disposed entirely on one side of the longitudinal centerline.

18. The independent suspension system of claim 17 wherein each of said first and second suspension assemblies further comprises:
    an air spring assembly operably disposed between said lower control arm and the frame wherein a load communicated between said wheel support member and the frame is at least partially transferrable through said air spring assembly.

* * * * *